(12) United States Patent
Montagna et al.

(10) Patent No.: US 6,848,733 B2
(45) Date of Patent: Feb. 1, 2005

(54) CO-FORMED BED LINER HAVING ENHANCED FRICTIONAL CHARACTERISTICS

(75) Inventors: John C. Montagna, Metamora, MI (US); Gary J. Nehring, Linden, MI (US); Donald J. LaBelle, Macomb Township, MI (US)

(73) Assignee: Durakon Industries, Inc., Lapeer, MI (US)

( * ) Notice: Subject to any disclaimer, the term of this patent is extended or adjusted under 35 U.S.C. 154(b) by 0 days.

(21) Appl. No.: 10/290,676

(22) Filed: Nov. 8, 2002

(65) Prior Publication Data

US 2004/0090077 A1 May 13, 2004

(51) Int. Cl.[7] .......................... B60R 13/01; B62D 33/02
(52) U.S. Cl. ..................... 296/39.2; 296/39.1
(58) Field of Search .................. 296/39.1, 39.2, 296/97.23; 105/423

(56) References Cited

U.S. PATENT DOCUMENTS

| | | | | |
|---|---|---|---|---|
| 3,030,251 A | * | 4/1962 | La Bore et al. | 428/40.1 |
| 3,895,153 A | * | 7/1975 | Johnston et al. | 428/141 |
| 4,336,293 A | * | 6/1982 | Eiden | 428/143 |
| 4,693,507 A |   | 9/1987 | Dresen et al. |  |
| 4,984,673 A | * | 1/1991 | Saito et al. | 198/333 |
| 5,007,670 A | * | 4/1991 | Wise | 296/39.1 |
| 5,322,335 A | * | 6/1994 | Niemi | 296/39.1 |
| 5,474,829 A | * | 12/1995 | Woosley | 296/39.1 |
| 5,648,031 A | * | 7/1997 | Sturtevant et al. | 296/39.2 |
| 5,806,909 A | * | 9/1998 | Wise | 296/39.1 |
| 5,858,508 A | * | 1/1999 | Sturtevant et al. | 428/147 |
| 6,017,075 A | * | 1/2000 | Emery et al. | 296/39.1 |
| 6,048,017 A | * | 4/2000 | Doshi | 296/39.2 |
| 6,076,879 A | * | 6/2000 | Bills et al. | 296/39.1 |
| 6,095,787 A |   | 8/2000 | Bills, Sr. |  |
| 6,129,402 A | * | 10/2000 | Carriere | 296/39.1 |
| 6,176,537 B1 | * | 1/2001 | Doshi | 296/39.2 |
| 6,237,980 B1 | * | 5/2001 | Miles et al. | 296/39.2 |
| 6,245,694 B1 | * | 6/2001 | Davenport et al. | 296/39.1 |
| 6,303,197 B1 | * | 10/2001 | Hodgetts | 296/39.1 |
| 6,431,629 B1 | * | 8/2002 | Emery | 296/39.2 |
| 6,509,084 B2 | * | 1/2003 | Sturtevant et al. | 296/39.2 |
| 2001/0035661 A1 | * | 11/2001 | Doshi | 296/39.2 |
| 2002/0140247 A1 | * | 10/2002 | Emery | 296/39.1 |

\* cited by examiner

*Primary Examiner*—D. Glenn Dayoan
*Assistant Examiner*—H. Gutman
(74) *Attorney, Agent, or Firm*—Akin Gump Strauss Hauer & Feld, LLP

(57) ABSTRACT

A motor vehicle bed or bed liner is vacuum formed from a panel of co-formed layers of thermoplastic material having a roughened surface. The panel is co-formed of two layers of material having distinct compositions and characteristics. The upper surface of the co-formed composite is then roughened or textured by a brush which contacts one surface. The co-formed and roughened composite panel is then vacuum formed into, for example, a truck bed or bed or cargo compartment liner.

12 Claims, 5 Drawing Sheets

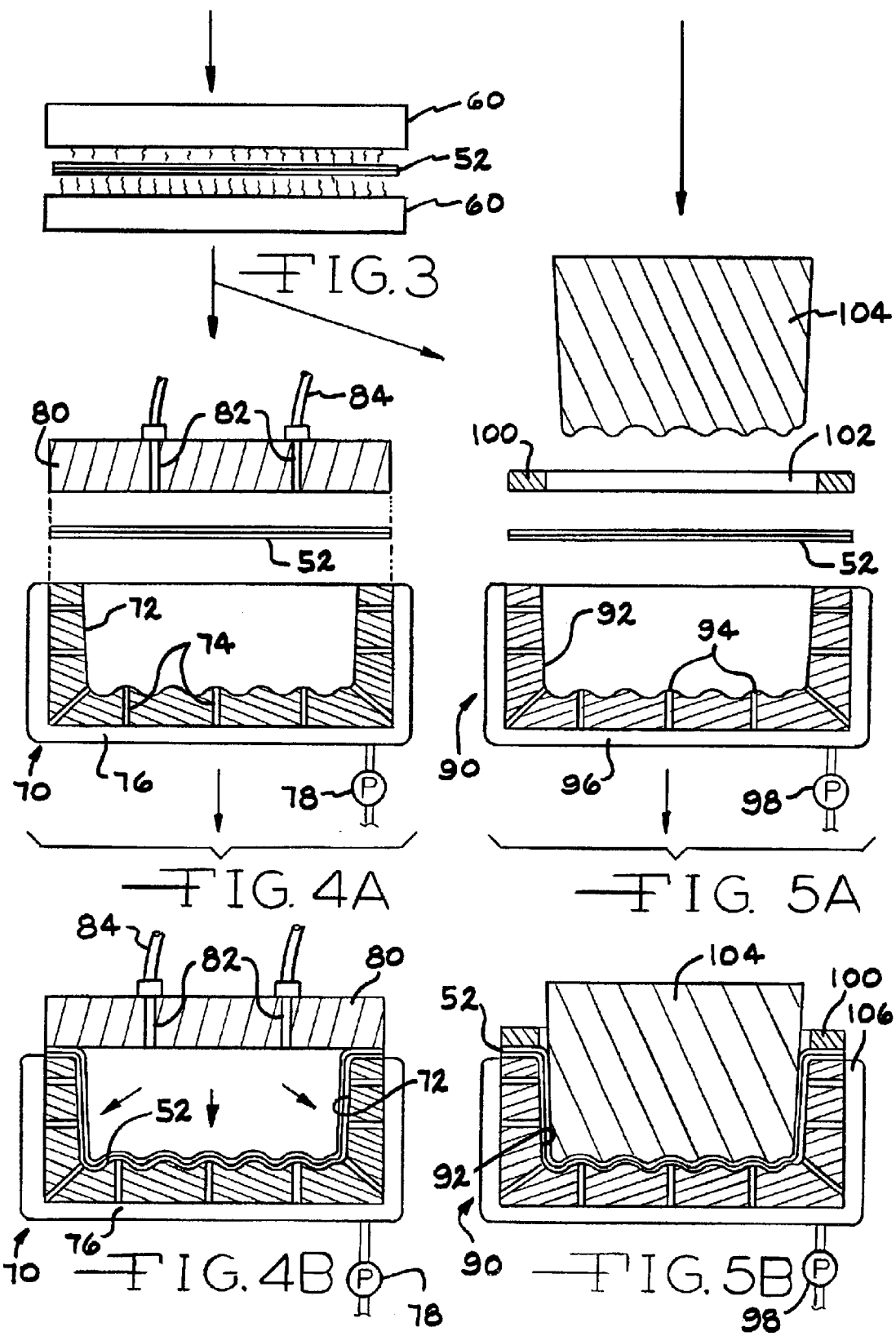

CO-FORMED BED LINER HAVING ENHANCED FRICTIONAL CHARACTERISTICS

BACKGROUND OF THE INVENTION

The invention relates generally to beds and bed liners for motor vehicles and more particularly to beds and bed liners fabricated of a co-formed composite panel having a roughened, friction enhancing surface.

Liners for motor vehicle cargo compartments, particularly liners for SUV's and cargo vans, and bed liners for pickup trucks provide many benefits. First of all, such bed liners provide a resilient barrier between the cargo area and the actual truck bed or vehicle which absorbs energy and reduces denting and damage to the bed when heavy loads are transported. Furthermore, such liners protect the vehicle bed or interior from water, dirt, salt and any other material which might damage or deteriorate the protected region of the vehicle.

One drawback that accompanies components such as beds and bed liners which are typically made from thermoplastic or other organic materials is the relatively low coefficient of friction exhibited by their load supporting surfaces. This low coefficient of friction manifests itself as spontaneous repositioning of cargo during abrupt maneuvers such as rapid cornering. Frequently, their coefficient of friction will be lower than that of the unprotected vehicle bed or cargo compartment floor.

Accordingly, it would be desirable for a liner product to exhibit both the protective features of a bed or cargo compartment liner while providing a cargo contacting surface which exhibits a coefficient of friction equal to or greater than that of an unprotected bed.

SUMMARY OF THE INVENTION

A motor vehicle bed or bed liner is vacuum formed from a panel of co-formed layers of thermoplastic material having a roughened surface. The panel is co-formed of two layers of material having distinct compositions and characteristics. The upper surface of the co-formed composite is then roughened or textured by a brush which contacts one surface. The co-formed and roughened composite panel is then vacuum formed into, for example, a truck bed or bed or cargo compartment liner. The present invention comprehends both the method of fabrication and the resulting product.

Thus it is an object of the present invention to provide a motor vehicle bed or bed liner having enhanced frictional characteristics.

It is a further object of the present invention to provide a motor vehicle bed or bed liner formed from a composite panel of co-formed thermoplastic material having a roughened surface.

It is a still further object of the present invention to provide a motor vehicle bed or bed liner which is vacuum formed from a co-formed two layer composite of thermoplastic material having a roughened surface.

It is a still further object of the present invention to provide a method of fabricating a motor vehicle bed or bed liner from a co-formed composite of thermoplastic materials having a roughened surface.

It is a still further object of the present invention to provide a method of fabricating a motor vehicle bed or bed liner by vacuum forming a co-formed composite panel of thermoplastic materials having a roughened surface.

Further objects and advantages of the present invention will become apparent by reference to the following description of the preferred embodiment and appended drawings wherein like reference numbers refer to the same component, element of feature.

BRIEF DESCRIPTION OF THE DRAWINGS

FIG. 3 is an optional heating step for raising the temperature of the composite sheet or panel prior to thermoforming;

FIGS. 4A and 4B schematically illustrated the thermoforming of a bed or bed liner from a composite sheet within a mold by the application of vacuum to one side of the sheet and pressure to the other;

FIGS. 5A and 5B schematically illustrate the thermoforming of a bed or bed liner from a composite sheet within an outer vacuum mold and a movable forming insert;

DETAILED DESCRIPTION OF THE INVENTION

Figure 1:
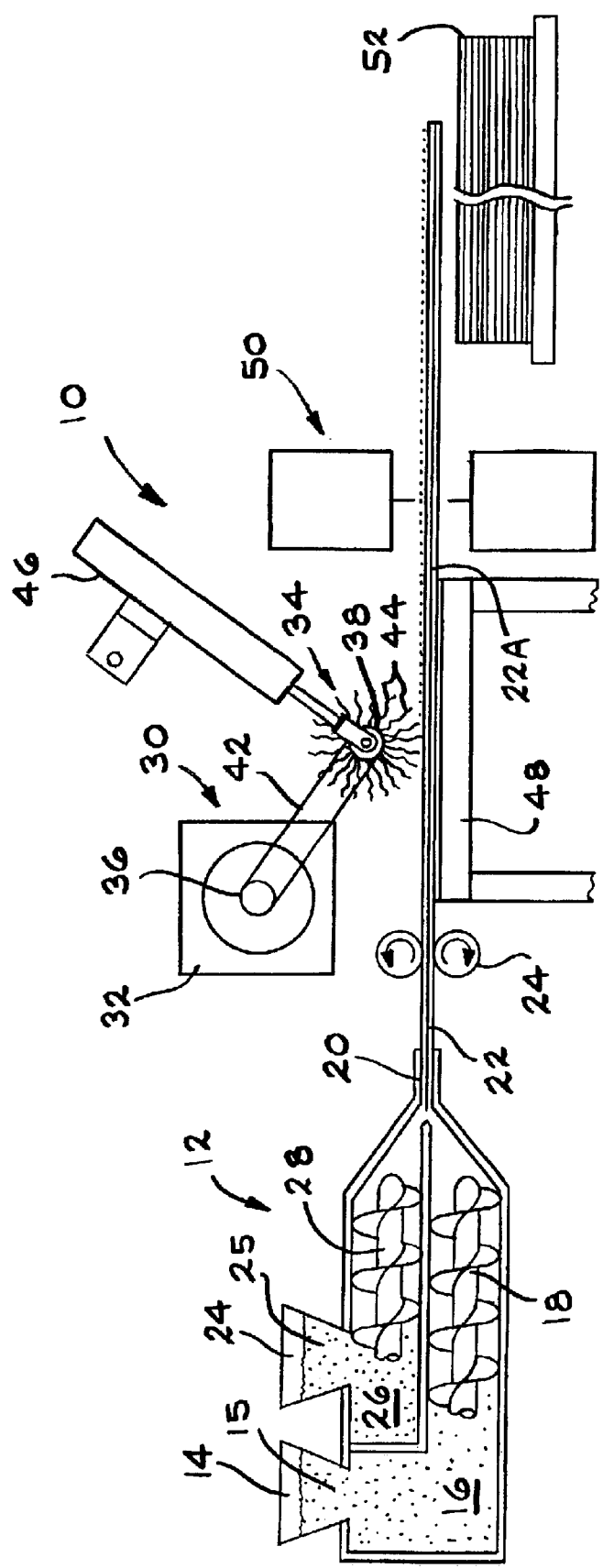
FIG. 1 schematically illustrates a manufacturing process for co-forming by co-extrusion a composite, two layer sheet having a roughened upper surface.

Referring now to FIG. 1, an apparatus for co-forming a composite two layer sheet and roughening or abrading its upper surface is illustrated and generally designated by the reference number 10. The apparatus 10 includes a dual co-forming or co-extruding machine 12 having a first hopper 14 which may be filled with, for example, a first pelletized thermoplastic material 15, which is provided to a first interior, heated region 16 of the machine 12 having a first auger drive assembly 18 which forces the heated thermoplastic material 15 into a lower portion of a horizontally elongate extrusion nozzle 20. The first thermoplastic material 15 typically functions as the lower layer or substrate of the co-formed extrudate 22 or finished product and is therefore preferably selected from thermoplastics having good ruggedness and temperature stability such as high density polyethylene (HDPE) and similar materials.

The machine 12 also includes a second hopper 24 which provides a second pelletized thermoplastic material 25 into a second interior, heated region 26 of the machine 12 having a second auger drive assembly 28 which provides the second melted thermoplastic material 25 to an upper portion of the extrusion nozzle 20. The second thermoplastic material 25 becomes the upper layer of the co-formed extrudate 22 or finished product and is therefore preferably selected from softer thermoplastics having relatively higher coefficients of friction and which are amenable to surface treatment such as abrading. Materials such as low density polyethylene (LDPE), linear low density polyethylene (LLDPE), polypropylene, and other polyolefins have been found suitable.

The extruded material or extrudate 22 is then engaged by one or more pairs of vertically aligned, horizontally extending, contra-rotating rollers 24 which compress and size the extruded material or extrudate 22 as well as assist its uniform withdrawal from the extrusion nozzle 20 and translation therefrom. The rollers 24, particularly if they are utilized in multiple pairs, also assist the stabilization of the extruded material 22 through cooling.

Adjacent and downstream the pair(s) of rollers 24 is an assembly 30 for providing a roughened or textured upper surface to the extruded material 22. The assembly 30 includes a prime mover, such as an electric motor 32 which is coupled to a circular, elongate brush assembly 34 by a pair of pulleys 36 and 38, one of which is disposed upon an output shaft to the motor 32 and the other of which is disposed upon one end of the circular, elongate brush assembly 34 and a belt 42. The circular, elongate brush assembly 34 includes a plurality of radially extending, relatively stiff brush elements or bristles 44. The bristles 44 are preferably metal but other less rigid materials may be utilized if the lengths of the bristles 44 are reduced or the sizes, i.e., diameters, of the bristles 44 are increased.

The brush assembly 34 is disposed above and in contact with the upper surface of the extruded material 22. Preferably, the brush assembly 34 rotates in a direction such that at the region of contact between the brush assembly 34 and the upper surface of the extruded material 22, the tips of the bristles 44 are traveling in a direction opposite that of the extruded material 22. However, the brush assembly 34 may also rotate such that at the region of contact between the brush assembly 34 and the upper surface of the extruded material 22, the tips of the bristles 44 are traveling in the same direction as the extruded material 22, as long as the surface (tip) speed of the bristles 44 is faster or slower than the surface speed of the extruded material 22. The extent or degree of contact (impingement) of the bristles 44 on or against the upper surface of the extruded material 22 may be adjusted by a bi-directional linear translating mechanism 46 which is preferably an electrically operated lead screw or which may be a servo-controlled hydraulic or pneumatic cylinder. Preferably, a stationary support or table 48 or circulating conveyor (not illustrated) supports the extruded material 22 in the vicinity of the brush assembly 34.

The bristles 44 of the brush assembly 34 score, abrade or roughen the surface of the extruded material 22 and create a plurality of irregular, generally aligned, short arcuate depressions. This irregular, roughened surface extruded material 22A provides enhanced frictional characteristics thereby reducing the sliding and movement of loads placed upon the extruded, roughened surface material 22A when it is utilized as a van liner, truck bed, truck bed liner or other, similar load bearing product.

Figure 2A:
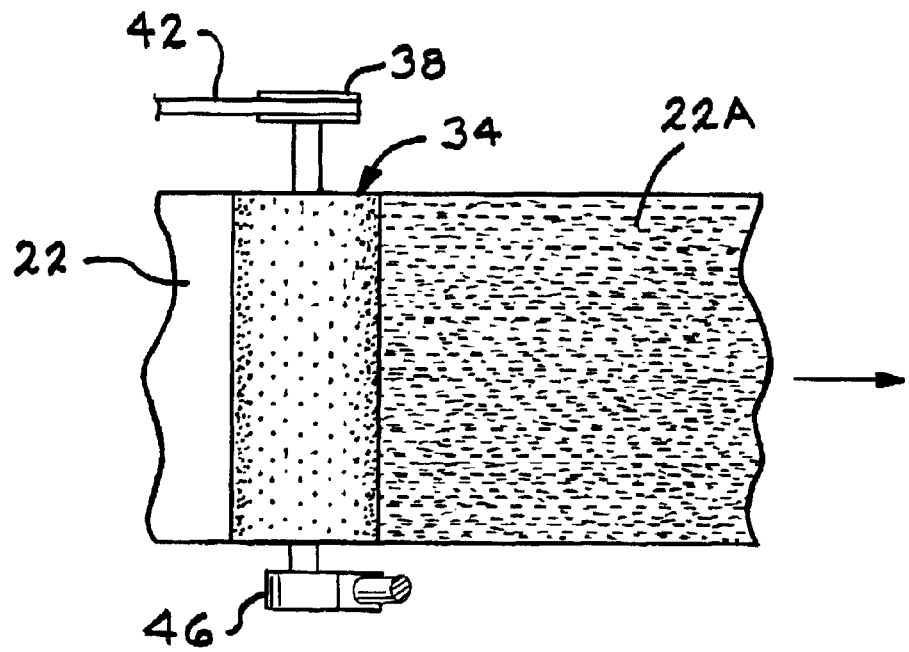
FIGS. 2A and 2B illustrate roughening of the full width of the upper surface and partial width of the upper surface corresponding to the bottom panel of a truck bed of the composite, two layer sheet.
Figure 2B:
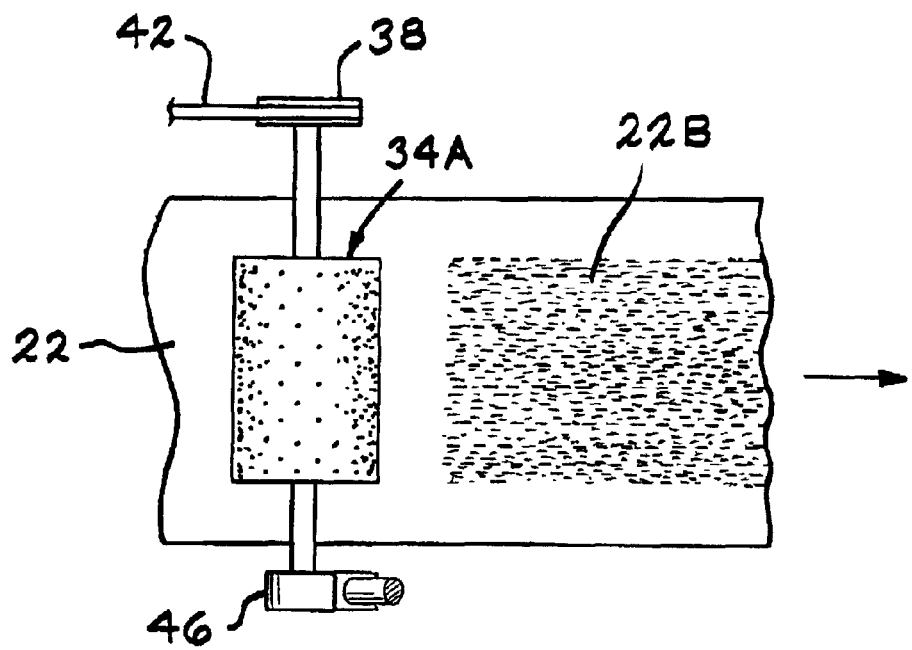

Referring now to FIGS. 2A and 2B, it will be appreciated that the width of the brush assembly 34 may be adjusted or selected relative to the width of the extrudate or extruded material 22. In FIG. 2A, the width of the brush assembly 34 is substantially equal to, or slightly wider than, the width of the extruded material 22 in order to uniformly roughen the surface of the extruded material 22 across its entire width. By so doing, the appearance and frictional coefficient across the surface of the material is uniform. In FIG. 2B, the width of the brush assembly 34A is reduced to approximately 60% of the total width of the extruded material 22 and the brush assembly 34A is disposed in the center of the extruded material 22 with equal left and right margins as illustrated. Here, the roughened surface 22B is restricted to that portion of the extruded material 22 which will form the bottom panel or portion of a truck bed or bed liner. The portions which will form the sidewalls of the bed or bed liner are left with the relatively smooth finish provided by the extrusion nozzle 20 and the rollers 24. It should be understood that the 60% width recited is only approximate and that different configurations of beds and bed liners wherein the bottom panel width relative to the height of the sidewalls is greater or lesser will result in the roughened width being likewise greater or lesser but typically no more than 80% of the width of the extruded material 22 and not less than 50% of its width.

The bi-directional linear translating mechanism 46, in addition to adjusting the extent of impingement between the bristles 44 on the upper surface of the extruded material 22 may also be operated to raise the brush assembly 34 out of contact with the upper surface of the extruded material 22 in a cyclic fashion such that the roughened surface 22B will correspond to or cover only the bottom panel of a finished bed or bed liner and not extend along (up) the front panel. Thus, the bi-directional linear translating mechanism 46 will be cycled up so that the brush assembly 34A is out of contact with the extruded material 22 as that portion of the extruded material 22 corresponding to the front panel of a finished bed or bed liner passes underneath. The brush assembly 34A will then be lowered back into contact with the extruded material 22 as a next length of the extruded material 22 corresponding to the length of the bottom panel or portion of a bed or bed liner passes under the brush assembly 34A. In this manner, only that portion of the extruded material 22 corresponding to the bottom panel of a finished bed liner will be roughened while those portions corresponding to the sides and the front panel will exhibit the relatively smooth finish provided by the nozzle 20 of the extruding machine 12 and the pair of rollers 24, as noted above.

Referring again to FIG. 1, the extruded material 22A having a roughened upper surface is provided to a cutter or cutting assembly 50 which cuts the extruded and surface roughened material 22A into sheets or panels 52 of a desired length which may then be utilized to form van or truck bed liners, truck beds or similar products.

FIG. 3 schematically illustrates a heating step where the temperature of the sheets or panels 52 may be elevated preparatory to thermoforming. A pair of horizontal, parallel and spaced apart heaters 60 which may include forced air or radiant heating assemblies supplied with, for example, gas or electricity, receive a sheet or panel 52 for a sufficient period of time to raise it to an elevated temperature, as noted above, several hundred degrees Fahrenheit. When the sheet or panel 52 has been raised to a sufficient temperature, it may be thermoformed by one of the two processes described below or another comparable or analogous thermoforming process. It should be understood, however, that if one of the following thermoforming processes are carried out immediately or directly after the sheets or panels 52 are produced, it may be possible to dispense with the heating step illustrated in FIG. 3.

Turning then to FIGS. 4A and 4B, a vacuum and pressure forming process is illustrated. The process utilizes a vacuum die or mold assembly 70 having an interior or female mold surface 72 which precisely reproduces the desired outer form and configuration of a product such as a truck bed or bed liner. The mold surface 72 includes a plurality of vacuum passageways 74 which lead from the mold surface 72 to a vacuum plenum 76. The vacuum plenum 76 surrounds the mold assembly 70 and is in communication with a vacuum pump 78 which draws a partial vacuum in the plenum 76 and draws air through the vacuum ports 74. A sheet or panel 52 at an elevated temperature is placed upon the mold assembly 70 and a mold plate or cover 80 having a size which is coextensive with the size of the mold assembly 70 is positioned on top of the sheet or panel 52 which is positioned on top of the mold assembly 70. Pressurized air is provided to a plurality of pressure ports 82 in the mold plate or cover 80 through a plurality of flexible hoses 84. The vacuum pump 78 is activated and a vacuum is drawn on the lower surface of the sheet or panel 52 and air pressure is applied to the upper surface of the sheet or panel 52. The vacuum drawn on the lower surface of the sheet or panel 52 and the air pressure on the upper surface of the sheet or panel 52 forms it into intimate contact with the mold surface 72 as illustrated in FIG. 4B.

Referring now to FIGS. 5A and 5B, an alternate thermoforming process is illustrated. As an alternative to forming a product such as a bed or bed liner through vacuum and pressure forming as illustrated in FIGS. 4A and 4B, a product may be formed through the use of male and female mold segments which are either fixed or, particularly in the case of the male mold segment, may include moveable corner sections or other moveable features such as bladders which may facilitate separation of the molds segments and/or improve the uniform distribution of material within the mold and in the finished product.

FIGS. 5A and 5B schematically present such a process. This process utilizes a conventional female mold assembly 90 having an interior surface 92 which corresponds to the exterior size and configuration of the final molded product. The mold assembly 90 includes a plurality of through passageways 94 which communicate between the interior mold surface 92 and a vacuum plenum 96 which surrounds the mold assembly 90. The plenum 96 is in communication with a vacuum pump 98 which, according to conventional practice, draws a distributed vacuum over the interior surface 92 of the mold assembly 90.

The alternate thermoforming process utilizes the sheet or panel 52 which is placed above the mold assembly 90 and beneath a clamping frame 100 which engages the sheet or panel 52 about a region adjacent its peripheral edge and clamps the sheet or panel 52 to the mold so that it is stretched during the molding process. The clamping frame 100 includes a large open region 102 through which a male mold segment or plug 104 is vertically translatable. The male mold segment or plug 104 may include moveable mold components such as corner sections or plugs (not illustrated) which may be either a fixed configuration and bi-directionally translatable or may be inflatable bladders to appropriately engage and translate portions of the sheet or panel 52 into intimate contact with the various panels and features defined by the interior surface 92 of the mold assembly 100.

As illustrated in FIG. 5B, the frame 100 is lowered into intimate contact with the upper surface of the sheet or panel 52 and the male mold segment or plug 104 is lowered into the mold cavity of the mold assembly 90. The vacuum pump 98 is activated, thereby drawing the sheet or panel 52 into intimate contact with the interior surface 92 of the mold assembly 90 thereby forming the sheet or panel 52 into the desired final shape of the product.

Figure 6:
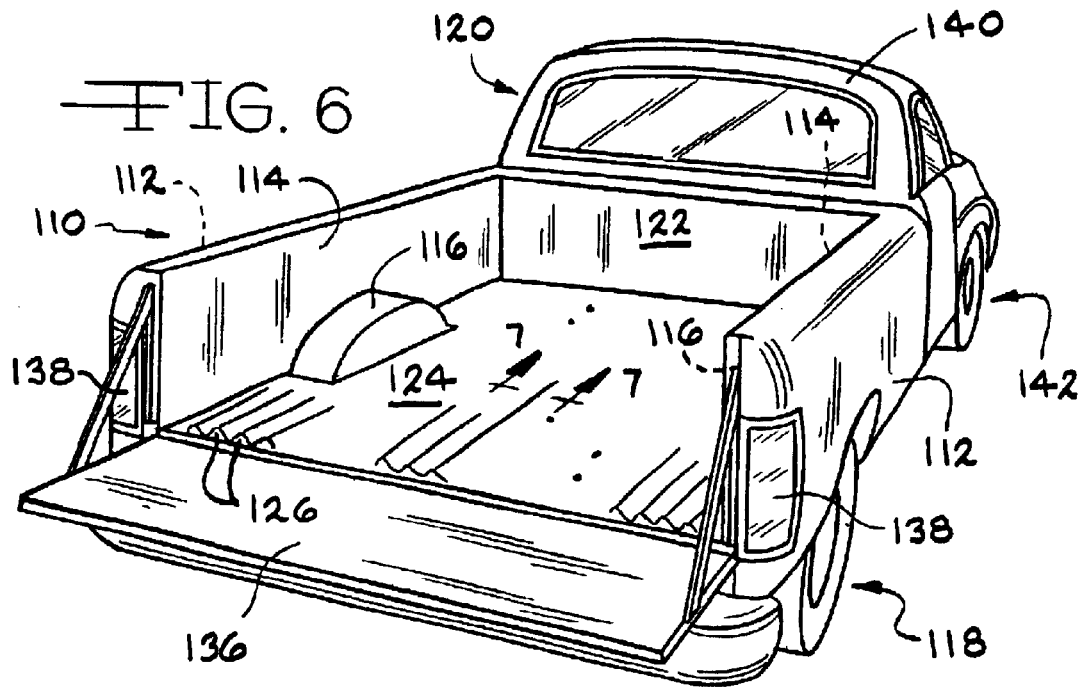
FIG. 6 is perspective view of a pickup truck having a non-metallic box or bed according to the present invention.
Figure 7:
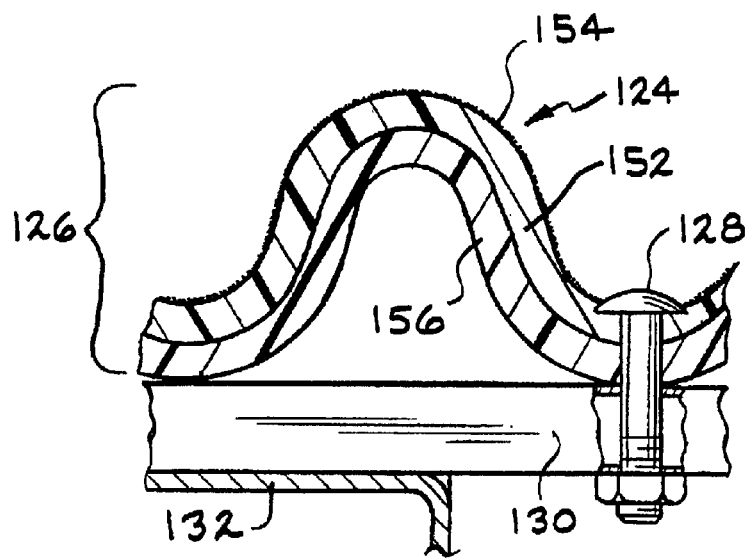
FIG. 7 is a greatly enlarged, fragmentary, sectional view of a truck bed taken along line 7—7 of FIG. 6.

Referring now to FIGS. 6 and 7, a non-metallic pickup truck bed manufactured according to the present invention is illustrated and designated by the reference number 110. The non-metallic pickup truck bed 110 is a unitary, co-formed structure preferably molded from two of the engineered thermoplastics described above such as high density polyethylene (HDPE), low density polyethylene (LDPE), polypropylene, or similar materials. The pickup truck bed 110 includes outer sidewalls 112 which merge smoothly with opposed generally parallel inner sidewalls 114. The inner sidewalls 114 are interrupted by opposed, spaced apart wheel wells 116 which are suitably sized and located to accommodate the respective rear tire and wheel assemblies 118 of a pickup truck 120 or similar light to medium duty cargo vehicle. The opposed inner sidewalls 114 merge with a transversely extending front wall 122 which may define a single panel interconnecting and merging with the inner opposed sidewalls 114 or a double wall panel having inner and outer panels which interconnect and merge with respective ones of the inner sidewalls 114 and the outer sidewalls 112. The pair of inner sidewalls 114 and the transverse front wall 122 all merge with and are interconnected by a floor or bottom panel 124.

To improve the strength and rigidity of the floor or bottom panel 124, it preferably defines a plurality of corrugations 126 which extend longitudinally substantially its full length. A plurality of fasteners such as carriage bolts 128 or other mechanical fastening devices extend through the bottom panel 124 and secure the pickup truck bed 110 to a plurality of transverse braces or members 130 which are, in turn, secured to a frame or undercarriage 132 of the pickup truck 110. A tailgate assembly 136 is pivotally disposed across the open end of the pickup truck bed 110. Preferably and typically, the non-metallic pickup truck bed 110 also includes backup and taillight assemblies 138 which function in accordance with conventional practice. The pickup truck 120 also includes a conventional cab 140 as well as front tire and wheel assemblies 142.

Referring now to FIG. 7, a portion of the plurality of corrugations 126 of the bottom panel 124 are illustrated in enlarged cross-section. In FIG. 7, the bottom panel 124 which includes two layers of distinct materials which have been co-formed by extrusion into continuous sheets, cut and then formed into the desired shape and configuration according to the methods described above, includes a first or upper layer 152 which has a roughened surface 154 prepared according to the process described above. The bottom panel 124 also includes a second or lower layer 156 which may be referred to as the substrate and generally may be the more rugged material which supports the upper layer 152.

Figure 8:
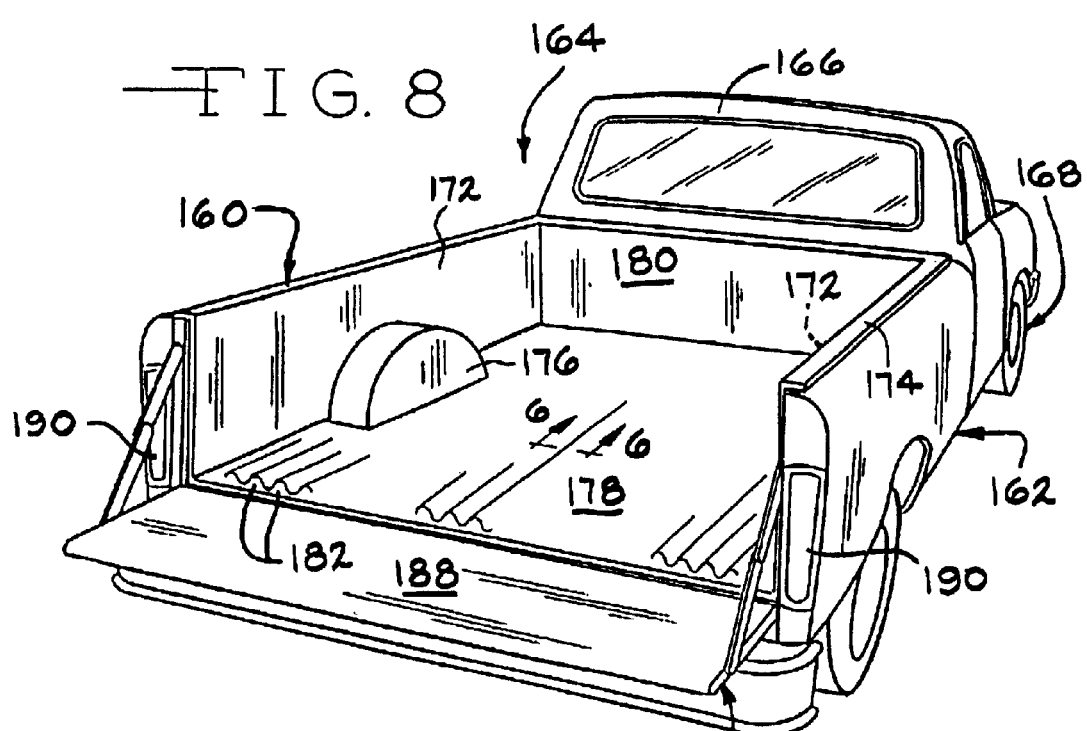
FIG. 8 is a perspective view of a pickup truck and conventional metal box or bed having a composite bed liner according to the present invention.
Figure 9:
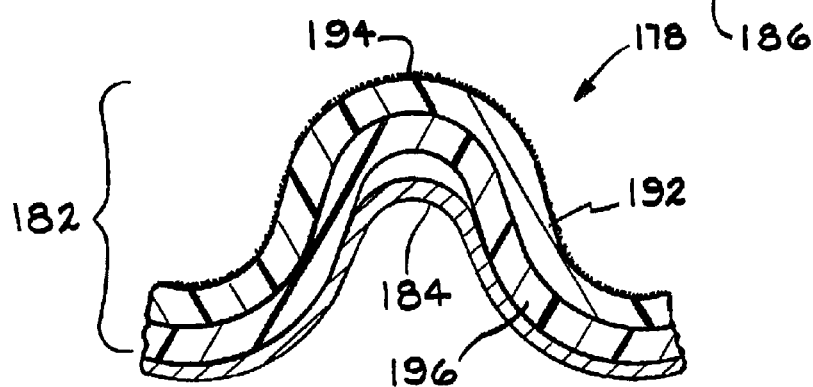
FIG. 9 is a greatly enlarged, fragmentary, sectional view of a bed liner taken along line 9—9 of FIG. 8.

Referring now to FIGS. 8 and 9, a pickup truck bed liner is illustrated and generally designated by the reference number 160. The pickup truck bed liner 160 is utilized in a conventional metal box or bed 162 of a pickup truck 164 having a cab 166 and front tire and wheel assemblies 168. The bed liner 160 includes sidewalls 172 which may include an upper rail 174 and a pair of opposed wheel wells 176 which extend between the sidewalls 172 and a floor or bottom panel 178. The bed liner 160 disclosed herein is the style referred to as an "over the rail" bed liner. It should be appreciated that the present invention is equally suitable and usable with "under the rail" bed liners which are similar in most respects to the bed liner 160 disclosed herein except that they lack the upper rail 174. The floor or bottom panel 178 merges with both the sidewalls 172 and a front wall 180. The floor or bottom panel 178 preferably includes corrugations 182 complementary to the corrugations 184 of the pickup truck bed 162. A tailgate assembly 186 may include a protective cover 188 fabricated of materials similar to that from which the bed liner 160 is fabricated. The pickup truck 164 also preferably includes conventional taillight and backup light assemblies 190.

Referring now to FIG. 9, a portion of the bottom panel 178 of the pickup truck bed liner 160 illustrating the corrugations 182 which, as noted, are complementary to the corrugations 184 of the pickup truck bed, is illustrated in cross-section. In FIG. 9, an upper layer 192 includes a roughened or textured surface 194 according to the present invention and a lower or substrate portion 196.

The foregoing disclosure is the best mode devised by the inventors for practicing this invention. It is apparent, however, that products and methods incorporating modifications and variations will be obvious to one skilled in the art of truck beds, bed liners and manufacturing processes therefor. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

What is claimed is:

1. A cargo carrier for a motor vehicle comprising, in combination, a composite sheet having a first layer of a first thermoplastic material and a second layer of a second thermoplastic material bonded to said first layer, said composite sheet formed to define a pair of opposed, spaced apart sidewalls, a front wall extending between and merging with said sidewalls, a bottom panel extending between and merging with said sidewalls and said front wall and a pair of wheel well features disposed generally between said bottom panel and a respective one of said pair of sidewalls; and a roughened, friction enhancing surface residing on at least a portion of a surface of said bottom panel, said friction enhancing surface comprising a plurality of irregular, generally aligned, arcuate depressions.

2. The cargo carrier of claim 1 wherein said composite sheet is co-extruded.

3. The cargo carrier of claim 1 wherein said first layer is an upper layer selected from the group consisting of linear low density polyethylene and polyolefin.

4. The cargo carrier of claim 1 wherein said second layer is a lower layer of high density polyethylene.

5. The cargo carrier of claim 1 wherein said roughened, friction enhancing surface is achieved by a rotary brush.

6. The cargo carrier of claim 1 wherein said first and second layers are autogenously bonded together.

7. A cargo bed liner for a motor vehicle comprising, in combination, a composite sheet having a first layer of a first thermoplastic material and a second layer of a second thermoplastic material bonded to said first layer, said composite sheet formed to define a pair of opposed, spaced apart sidewalls, a front wall extending between and merging with said sidewalls, a bottom panel extending between and merging with said sidewalls and said front wall and a pair of wheel wells disposed generally between said bottom panel and a respective one of said pair of sidewalls; and a friction enhancing surface residing on at least a portion of a surface of said bottom panel and including a plurality of irregular, generally parallel arcuate depressions.

8. The cargo carrier of claim 7 wherein said composite sheet is co-extruded.

9. The cargo carrier of claim 7 wherein said first layer is an upper layer selected from the group consisting of linear low density polyethylene and polyolefin.

10. The cargo carrier of claim 7 wherein said second layer is a lower layer of high density polyethylene.

11. The cargo carrier of claim 7 wherein said friction enhancing surface is abraded by a rotary brush.

12. The cargo carrier of claim 7 wherein said first and second layers are bonded together.

* * * * *